United States Patent [19]

Turner

[11] Patent Number: 4,507,579

[45] Date of Patent: Mar. 26, 1985

[54] RECIPROCATING PISTON ELECTRIC MOTOR

[76] Inventor: Jack C. Turner, 1985 S. 1200 East, No. 2, Salt Lake County, Utah 84105

[21] Appl. No.: 537,080

[22] Filed: Sep. 29, 1983

[51] Int. Cl.$^3$ .............................................. H02K 7/06
[52] U.S. Cl. ........................................ 310/23; 310/15
[58] Field of Search ................... 310/23, 34, 17, 84 R

[56] References Cited

U.S. PATENT DOCUMENTS

| | | |
|---|---|---|
| 323,652 | 8/1885 | Farmer ................................. 310/23 |
| 357,374 | 2/1887 | Darling et al. ....................... 310/23 |
| 2,820,160 | 1/1958 | Erie ...................................... 310/23 |
| 3,105,162 | 9/1963 | Stevenson ............................ 310/23 |
| 3,210,852 | 10/1965 | Herndon .............................. 310/23 |
| 3,949,249 | 4/1976 | Wisley et al. .................... 310/23 X |

Primary Examiner—Mark O. Budd
Attorney, Agent, or Firm—Mallinckrodt, Mallinckrodt, Russell & Osburn

[57] ABSTRACT

A reciprocating piston electrical motor includes at least one nonmagnetic cylinder housing forming a piston chamber wherein a magnetic piston is freely slidably mounted. Spaced separate coils of wire are wrapped about respective ends of the cylinder housing leaving the intermediate length of the cylinder free of windings. One end of a piston rod is rigidly attached to the magnetic piston and the other end is rotatably attached to a crankshaft. The crankshaft is rotatably secured to a mounting base while the end of the cylinder housing away from the crankshaft is pivotally mounted to the mounting base. Means are provided for supplying electrical power to the coils to cause movement of the magnetic piston first to one end of the piston chamber and then to the other.

8 Claims, 6 Drawing Figures

RECIPROCATING PISTON ELECTRIC MOTOR

BACKGROUND OF THE INVENTION

1. Field

The invention in the field of reciprocating piston electrical motors.

2. State of the Art

Many attempts have been made to build a practical reciprocating piston electrical motor. For example, U.S. Pat. Nos. 2,894,154 and 3,105,102 show motors utilizing a solenoid arranged vertically so that upon energization of the solenoid, the piston is pulled upwardly and when de-energized, the piston moves downwardly. By energizing and de-energizing the solenoid coil, the piston reciprocates and a piston rod connected between the piston and a crankshaft converts the reciprocation to rotation. U.S. Pat. Nos. 3,832,608 and 4,019,103 show similar motors which utilize dual coil solenoids so as to pull the plunger pistons in alternately opposite directions. U.S. Pat. No. 3,949,249 shows a magnetic piston within a piston chamber wherein the direction of electromagnetic fields at either end of the piston chamber alternate to simultaneously pull and push the piston from one end of the piston chamber to the other and back again. U.S. Pat. Nos. 357,374, 2,056,719 and 4,093,880 show other types of reciprocating electrical engines using solenoids.

All of these engines utilize fixed piston chambers and a pivoted connection between the piston and piston rod, or, as shown U.S. Pat. No. 3,832,608, a piston rod having a pivot intermediate its length.

There remains room for an improved reciprocating electrical engine which is simple in construction and operation.

SUMMARY OF THE INVENTION

According to the invention, a reciprocating piston electrical motor includes at least one nonmagnetic cylinder housing forming a piston chamber wherein a magnetic piston is freely slidably mounted. Spaced seperate coils of wire are wrapped about respective ends of the cylinder housing leaving the intermediate length of the cylinder free of windings. One end of a piston rod is rigidly attached to the magnetic piston and the other end is rotatably attached to a crankshaft. The crankshaft is rotatably secured to a mounting base while the end of the cylinder housing away from the crankshaft is pivotally mounted to the mounting base. Means are provided for supplying electrical power to the coils to cause movement of the magnetic piston first to one end of the piston chamber and then to the other.

The means for supplying electrical power to the coils may alternately energize the coils in a manner so that when energized, a coil will set up a magnetic field which will attract the magnetic piston in the direction of the coil. Alternatively, such means may supply power to both coils so that when one coil sets up a magnetic field of direction to attract the piston, the other coil sets up a magnetic field which repels the piston. In this way, increased power is obtained since the piston is both pulled and pushed in each direction of its stroke. In order not to destroy the magnetic properties of the piston it is important that power be applied to the repelling coil only at times when the piston is not within the coil. The supply of power to the coils may be conveniently controlled by cams mounted on the crankshaft and associated cam-operated switches.

THE DRAWINGS

In the accompanying drawings, which illustrate an embodiment of the motor constituting the best mode presently contemplated of carrying out the invention in actual practice:

FIG. 1 is a top plan view of a one cylinder embodiment of the motor of the invention;

FIG. 2, a vertical section taken on the line 2—2 of FIG. 1;

FIG. 3, a fragmentary side elevation taken on the line 3—3 of FIG. 1;

FIG. 4, a vertical section taken on the line 4—4 of FIG. 1;

FIG. 5, an electrical diagram showing the electrical connections between the coils, switches, and power supply for an embodiment of the invention using attraction of the piston only; and FIG. 6, an electrical diagram similar to FIG. 6, but for an embodiment providing for simultaneous attraction and repulsion of the piston.

DETAILED DESCRIPTION OF THE ILLUSTRATED EMBODIMENT

Figure 1:
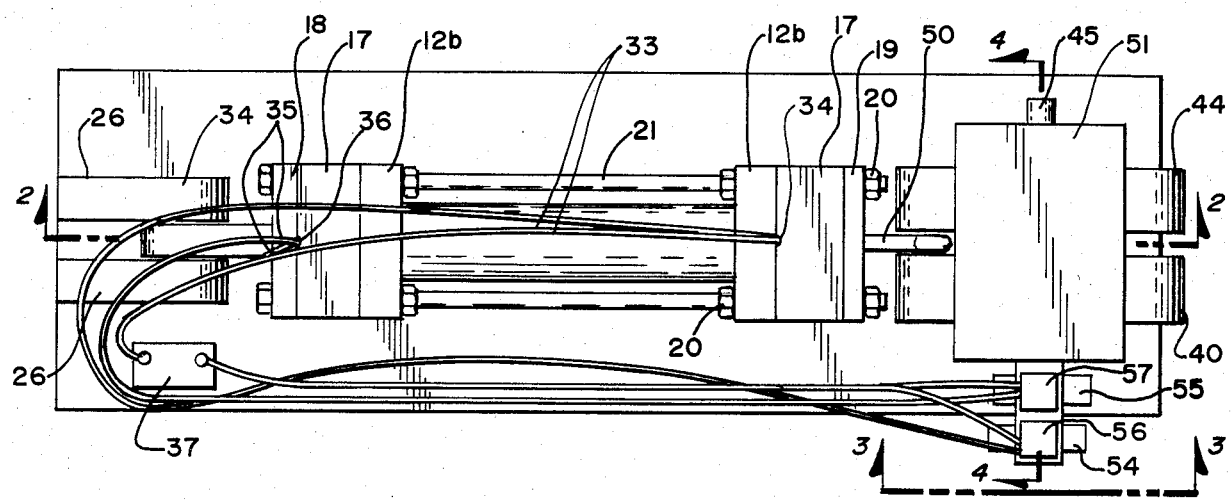

As illustrated in the drawings, a magnetic piston 10 is freely slidably mounted in piston chamber 11 formed by cylinder housing 12 made of a lightweight, nonmagnetic material, such as plastic or aluminum. The piston is preferably made of a material such as cobalt, a cobalt alloy, or other material, which is made into a strong permanent magnet. One end of the piston will be a magnetic north pole while the other end will be a magnetic south pole.

Extending inwardly from either end of cylinder housing 12 are end portions 12a of relatively thin wall thickness. These end portions are terminated by flange portions 12b intermediate the length of the cylinder housing. The central portion 12c of the cylinder housing is of wall thickness sufficient to make the cylinder housing strong enough to support itself and withstand stresses applied to it.

Respective coils of wire, shown schematically at 15 and 16, are placed about the end portions 12a of cylinder housing 12. Sleeves 17, which fit around coils 15 and 16 to strengthen the end portions of the cylinder housing assembly, abut cylinder flanges 12b. The sleeves and coils are held in place by end caps 18 and 19 which are secured to the flanges by nuts 20 and threaded rods 21 which extend through the end caps, the sleeves, and the flanges as shown. The rods 21 preferably extend the entire length of the cylinder housing assembly, as shown, to increase the overall strength of the assembly. While end portions 12a of the cylinder housing ensure a smooth piston chamber over its entire length, such end portions are not necessary and the coils could be held in place merely by sleeves 17. Further, rather than being separate parts, sleeves 17 could be an intergral part of end cap 18 and 19.

A mounting tab 25, secured to end cap 18 or made as an intergral part thereof, extends outwardly from the cylinder assembly into clevis 26 where it is pivotally held by pin 27. Clevis 26 is secured to a mounting base 30. Wires 33 extending from coil 16 through groove 34 in sleeve 17 and wires 35 extending from coil 15 through groove 36 in the second sleeve 17, run along the cylinder assembly and along clevis 26 to base 30 and to a source of electrical power for the coils, shown in FIG. 1 as battery 37 in conjunction with switches 56 and 57.

Figure 4:
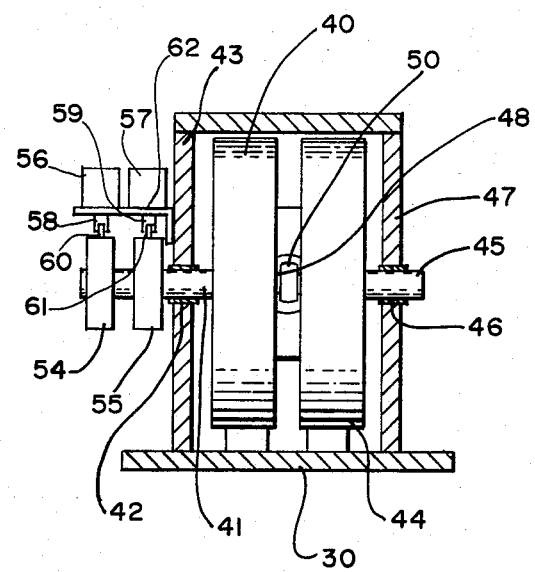

Flywheel 40, mounted on shaft 41, FIG. 4, which is journaled for rotation in bearing 42 and is secured to base 30 by support 43, and flywheel 44, mounted on shaft 45 which is journaled for rotation in bearing 46 and is secured to base 30 by support 47, are connected toward their outer periphery by pin 48 to form a crankshaft assembly. A piston rod 50 is rigidly secured to piston 10 at one end and rotatably secured to pin 48 of the crankshaft assembly at its other end. For added strength and stability supports 43 and 47 are joined across their top by plate 51.

Figure 3:
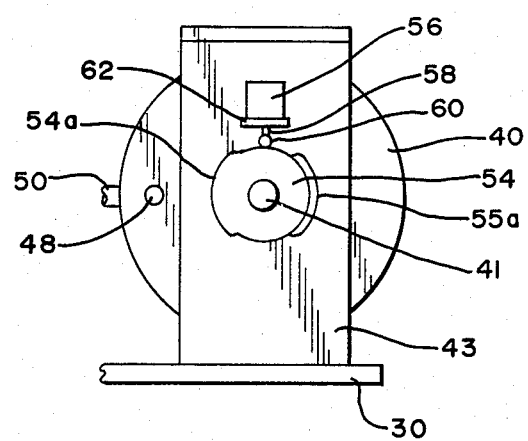

The flow of electricity to the coils of the motor is controlled by switches operated by cams attached to the portion of the crankshaft which forms an output shaft of the motor. Thus, secured to shaft 41 are cams 54 and 55 which control electrical switches 56 and 57, respectively, through switch control arms 58 and 59 and rollers 60 and 61, respectively. Switches 56 and 57 are supported by bracket 62 secured to support 43. In the embodiment shown, switches 56 and 57 are of the normally open type so that as rollers 60 and 61 roll along the normal reduced circumference of the cams, the switches remain open, but when the rollers move upwardly onto outwardly extending portions, such as 54a and 55a shown in FIG. 3, the switches close. In the embodiment shown, the outwardly extending portions of the cams will operate the switches at different times. Thus, with area 54a in position at the left portion of the cam 54 as shown in FIG. 3, a similar area 55a in cam 55 is at the right of cam 55, opposite the position of 54a.

Figure 5:
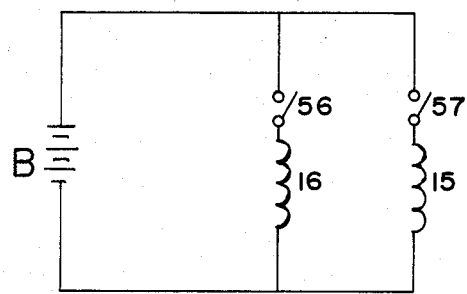

As shown in an electrical wiring diagram of FIG. 5, which corresponds to the physical wiring shown in FIG. 1, a battery B, corresponding to battery 37 in FIG. 1, is provided as the power source for the motor. Switch 56 is connected electrically in series with coil 16, such series connection being connected electrically in parallel with the series connection of switch 57 and coil 15. Thus, when switch 56 is closed, current flows from battery B through coil 16 thereby energizing it to create a magnetic field. When switch 57 is closed, current flows from battery B through coil 15 thereby energizing it to create a magnetic field. The direction of the magnetic field produced depends upon the direction of current flow through the coil.

In operation, in the position of the motor shown, with piston 10 at the end of a stroke, neither switch is closed so neither coil is energized. With the motor in operation and the flywheel turning in a clockwise direction, the movement of flywheels 40 and 44 will carry the piston from the position shown and start its movement toward the other end of the cylinder. As soon as the flywheels have turned enough so that the piston rod is in a position so that power applied to the piston will cause further rotation of the crankshaft, switch 56 is closed by raised cam portion 54a and coil 16 is energized creating a magnetic field of direction to draw piston 10 toward coil 16. As the piston approaches the end of its stroke, switch 56 is opened and coil 16 is de-energized. The flywheels continue rotating and carry piston 10 through the end of its stroke and start it back in the opposite direction. As soon as piston rod 50 is again in position to apply torque to the crankshaft, raised portion 55a of cam 55 causes switch 57 to close which energizes coil 15 to create a magnetic field of direction to draw piston 10 toward it. Again, coil 15 is de-energized as piston 10 reaches the end of its stroke. During movement of the piston, since piston rod 50 is rigidly attached to piston 10, the whole cylinder assembly will pivot back and forth about pin 27.

Figure 6:
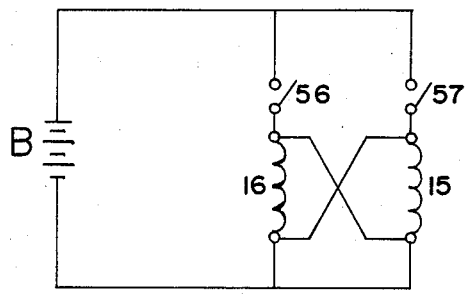

With the circuitry as shown in FIG. 5, only a pulling action is exerted to pull the piston from one end of the piston chamber to the other. For increased power, it may be desireable to provide for pushing the piston as well as pulling it. Thus, as shown in FIG. 6, each of the switches 56 and 57 may be connected to operate both coils 15 and 16 simultaneously. When switch 56 is closed, coil 16 is energized to create a magnetic field to attract the pole of the magnetic piston facing it while coil 15 is energized to create a magnetic field to repel the pole of the magnetic piston facing it. Thus, the piston is acted upon by both a pulling and pushing force. When switch 57 is closed, the coils are both energized again, but this time the direction of flow of electricity through each coil is reversed thereby reversing the magnetic fields generated so that the coil that pulls or attracts the piston with switch 56 closed, repels the piston when switch 57 is closed and the coil that repels with switch 56 closed, attracts with switch 57 closed.

Although FIG. 1 shows the physical arrangement of the circuitry shown in FIG. 5, the necessary additional connections to provide the circuitry of FIG. 6 would be obvious to one skilled in the art.

Figure 2:
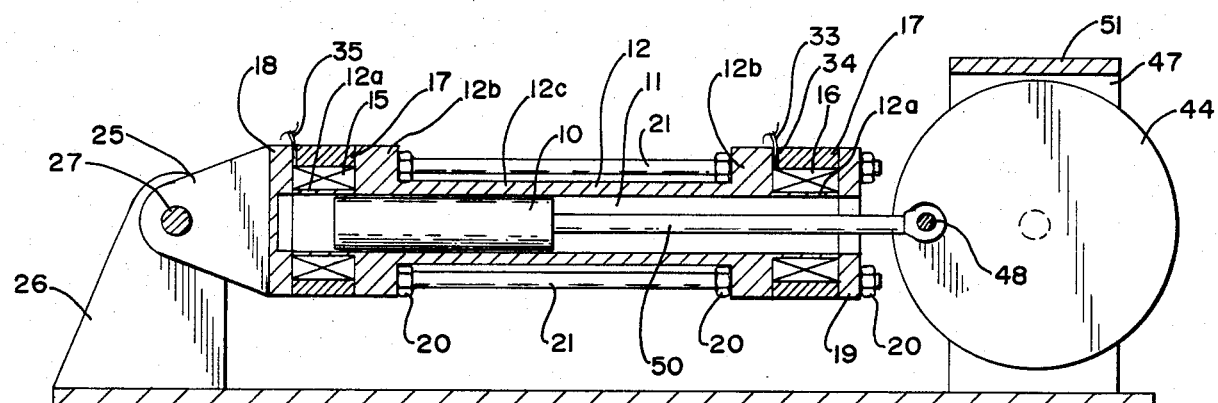

When the coils are arranged for both attracting and repelling, it is important that the repelling coil not be energized until the magnetic piston is completely out of the coil. If it is energized while the piston is within the coil, the magnetism of the piston is reduced and eventually destroyed. Thus, as shown in FIG. 2, coil 15 should not be energized until the end of the piston shown within the coil has moved sufficiently to the right so that it is no longer within the coil. For such purpose, it may be desireable to operate each coil separately so that the pulling coil is energized before the repelling coil. Such modification could easily be made by adding additional switches and cams.

While the motor is shown with the piston and cylinder assembly in horizontal position, and such position is suitable when the over-all cylinder and piston assembly is relatively light-weight, such cylinder and piston assembly could be mounted vertically, and in many instances such mounting would be preferred since it would minimize the lateral pressure on the piston moving in the piston chamber. Of course, if the piston and cylinder assembly is mounted vertically, plate 51 would have to be removed or modified by the addition of a slot for the piston rod.

Also, while a single cylinder assembly has been shown, additional cylinder assemblies could be added to the motor to give additional power. Such assemblies could be arranged so that at least one piston is on a power stroke at all times. In such instances, the engine could be started from a standstill by merely applying power to the particular cylinder assembly having a piston in a power stroke position. In other instances, such as the one cylinder example shown, a starting apparatus must be provided to initially start rotation of the drive shaft to get the piston into a position where the power stroke can begin. Such starting apparatus can be hand-operated or power-operated, and such apparatus are well known so are not described here.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A reciprocating piston electrical motor comprising a base; a crankshaft mounted for rotation on the base; at least one cylinder and piston assembly pivotally mounted on the base, said cylinder and piston assembly comprising a nonmagnetic cylinder housing forming a piston chamber and having flange portions at each end of a central portion, a magnetic piston freely slidable within the piston chamber, separate coils of wire wrapped about each end of the piston chamber, each coil abutting a flange portion of the cylinder housing and extending outwardly therefrom so as to leave an intermediate portion of the piston chamber free of such coils, a sleeve associated with and abutting each flange portion of the housing extending outwardly from the flange and surrounding the respective coil, an end cap at each end of the piston chamber abutting its associated sleeve, a plurality of bolts extending the entire length of the piston chamber and through each of the flanges, sleeves, and end caps so as to not only secure the respective sleeves and end caps to a flange, but also to strengthen the entire cylinder and piston assembly, a piston rod extending from one end of the piston chamber, said piston rod being rigidly connected to the magnetic piston at one end and rotatably connected to the crankshaft at the other end; and means for supplying electrical power to the coils of the at least one cylinder and piston assembly in such manner as to cause the magnetic piston to reciprocate in the piston chamber.

2. A reciprocating piston electrical motor according to claim 1, wherein the means for supplying electrical power to the coils applies electrical power alternately to one coil and then the other, and does so in such a manner that the coil to which power is applied generates a magnetic field which attracts the magnetic piston.

3. A reciprocating piston electrical motor according to claim 2, wherein electrical power is applied to a coil only during a portion of the stroke of the piston toward that coil.

4. A reciprocating piston electrical motor according to claim 3, wherein the supply of electrical power to each coil is controlled by an associated combination of a cam mounted on the crankshaft and a switch operated by the cam.

5. A reciprocating piston electrical motor according to claim 1, wherein the means for supplying electical power to the coils applies electrical power to the coils in such manner that, during at least a portion of the piston's stroke in each direction, one coil generates a field which repels the piston.

6. A reciprocating piston electrical motor according to claim 5, wherein electrical power is applied to the coil repelling the piston only during a portion of the piston's stroke when no portion of the piston is within said coil.

7. A reciprocating piston electrical motor according to claim 6, wherein the supply of electrical power to the coils during each direction of the piston's stroke is controlled by cams mounted on the crankshaft and switches operated by the cams.

8. A reciprocating piston electrical motor according to claim 1, wherein the cylinder and piston assembly is pivotably mounted on the base at its end opposite the end toward the crankshaft.

* * * * *